(12) United States Patent
Chorian et al.

(10) Patent No.: US 9,007,031 B2
(45) Date of Patent: Apr. 14, 2015

(54) AUTOMOTIVE VOLTAGE COMPENSATION SYSTEM AND METHOD

(75) Inventors: Steven F. Chorian, Canton, MI (US);
Venkateswa Anand Sankaran, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1627 days.

(21) Appl. No.: 11/842,589

(22) Filed: Aug. 21, 2007

(65) Prior Publication Data

US 2009/0051325 A1 Feb. 26, 2009

(51) Int. Cl.
H02J 7/00 (2006.01)
H02J 7/14 (2006.01)

(52) U.S. Cl.
CPC .................. H02J 7/1423 (2013.01)

(58) Field of Classification Search
USPC ........................................ 320/136
See application file for complete search history.

(56) References Cited

U.S. PATENT DOCUMENTS

| | | | |
|---|---|---|---|
| 5,182,510 A | 1/1993 | Nakamura | |
| 5,355,075 A | 10/1994 | Wilson, III | |
| 5,374,886 A | 12/1994 | Kohl et al. | |
| 6,163,136 A | 12/2000 | Celenza | |
| 6,177,780 B1 | 1/2001 | Roy et al. | |
| 6,240,347 B1 * | 5/2001 | Everhart et al. | 701/36 |
| 6,331,762 B1 | 12/2001 | Bertness | |
| 6,404,163 B1 | 6/2002 | Kapsokavathis et al. | |
| 6,515,456 B1 | 2/2003 | Mixon | |
| 6,665,158 B2 | 12/2003 | Walter | |
| 7,193,398 B2 | 3/2007 | Lanni | |
| 2003/0030415 A1 | 2/2003 | Tamai et al. | |
| 2003/0042872 A1* | 3/2003 | Larson | 320/152 |
| 2003/0173932 A1* | 9/2003 | Toya et al. | 320/104 |
| 2004/0164709 A1 | 8/2004 | Kapsokavathis et al. | |
| 2007/0057656 A1 | 3/2007 | Mayell et al. | |
| 2007/0222420 A1* | 9/2007 | Nishida et al. | 320/162 |

FOREIGN PATENT DOCUMENTS

| | | | |
|---|---|---|---|
| DE | 3243075 A1 | 6/1983 | |
| DE | 4037640 A1 | 6/1992 | |
| DE | 10332625 A1 | 3/2004 | |
| EP | 1919065 A2 | 5/2008 | |
| FR | 2562733 A1 | 10/1985 | |
| JP | 09289741 | 11/1997 | |

* cited by examiner

Primary Examiner — Arun Williams
(74) Attorney, Agent, or Firm — David B. Kelley; Brooks Kushman P.C.

(57) ABSTRACT

A power source is electrically connected with a battery and an electrical load. The power source has an output voltage and provides current for the battery and electrical load. A charging voltage for the battery is determined based on temperature of the battery. An offset voltage is determined based on the provided current to the battery. The output voltage is determined based on the charging and offset voltages.

20 Claims, 4 Drawing Sheets

AUTOMOTIVE VOLTAGE COMPENSATION SYSTEM AND METHOD

BACKGROUND

1. Field of the Invention

The invention relates to automotive power systems and methods of controlling the same.

2. Discussion

In some vehicles, e.g., alternatively powered vehicles, a DC/DC power converter may be packaged in an interior of the vehicle. Such packaging may increase the length of a cable connecting the DC/DC power converter to a battery. This additional length may increase electrical resistance associated with the cable and increase the voltage drop across the cable. As a result, the battery and any electrical loads, may operate at a voltage lower than if the battery were packaged in the vicinity of the DC/DC power converter.

SUMMARY

Embodiments of the invention may take the form of a power system for an automotive vehicle. The power system includes a power source for presenting a voltage and providing a current based on the presented voltage, a power storage unit configured to receive at least a portion of the provided current, and an electrical load having a variable demand for current and configured to receive at least a portion of the provided current. The power system also includes a control system for setting the presented voltage based on a temperature associated with the power storage unit and the provided current.

Embodiments of the invention may take the form of a power system for an alternatively powered vehicle. The power system includes a power converter having an output voltage and configured to provide current based on the output voltage, a battery configured to receive at least a portion of the provided current, and an electrical load having a variable demand for current and configured to receive at least a portion of the provided current. The power system also includes one or more controllers configured to set the output voltage based on a temperature associated with the battery and the provided current.

Embodiments of the invention may take the form of a method for setting an output voltage of a power source for an automotive vehicle. The method includes determining a desired charge voltage for a power storage unit, determining an offset voltage based on a current, and setting the output voltage of the power source based on the desired charge and offset voltages.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Embodiments of the invention employ voltage compensation to regulate a voltage output of a power source. For example, because the length of a battery cable is fixed for a given vehicle configuration, cable resistance may be calibrated into the power source. Additionally, the current output of the power source may be monitored or inferred. These parameters may be used to regulate the voltage output. As such, the power source may have an output that takes into account losses associated with the battery cable. Such an output may ensure, for example, proper charging of the battery.

Figure 1:
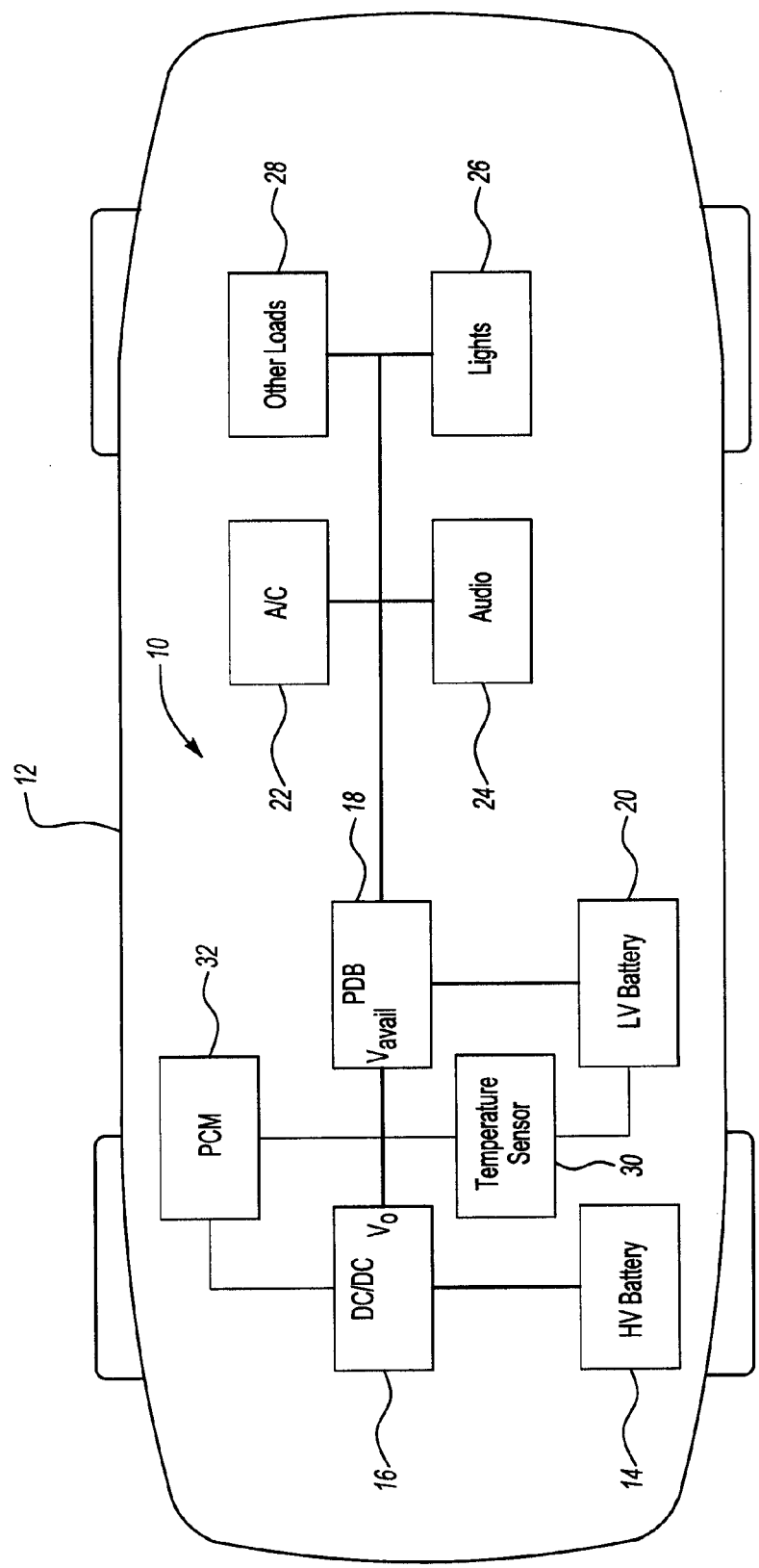
FIG. 1 is a schematic diagram of an example automotive power system.

FIG. 1 is a schematic diagram of power system 10 for vehicle 12. Heavy lines between elements indicate the flow of power, e.g., electrical power. Light lines between elements indicate the flow of information, e.g., communications. High voltage battery 14 provides high voltage power to DC/DC power converter 16, e.g., bi-directional buck/boost converter. DC/DC power converter 16 converts this high voltage power to low voltage. As a result, DC/DC power converter outputs a voltage, e.g., $V_o$.

Power distribution box 18, e.g., electrical hub, distributes the current required, e.g., $I_o$, to support low voltage battery 20, air conditioning system 22, audio system 24, lighting system, 26, and other electrical loads 28. This current may vary over time as occupants of vehicle 12 may selectively operate loads, 22, 24, 26, 28 and low voltage battery 20 may selectively be charged. Power distribution box 18 pulls the required current, e.g., $I_o$, from DC/DC power converter 16 based on $V_o$.

In the embodiment of FIG. 1, an electrical cable, having a resistance $R_{cable}$, electrically connects DC/DC power converter 16 and power distribution box 18. As such, as current travels along this cable, the voltage drops due to losses, e.g., $V_{loss}=I_o \times R_{cable}$. The resulting voltage at power distribution box 18, e.g., $V_{avail}$, is the voltage available, for example, to charge low voltage battery 20.

Temperature sensor 30 senses a temperature, e.g., $T_{batt}$, in the vicinity of low voltage battery 20, e.g., under hood temperature, battery temperature, etc. Powertrain control module 32 reads $T_{batt}$ and determines a charge voltage, e.g., $V_{charge}$, for low voltage battery 120 based on $T_{batt}$. Powertrain control module communicates, e.g., broadcasts, $V_{charge}$ to DC/DC power converter 16. As discussed below, DC/DC power converter 16 sets $V_o$ based on $V_{charge}$ and $I_o$.

Figure 2:
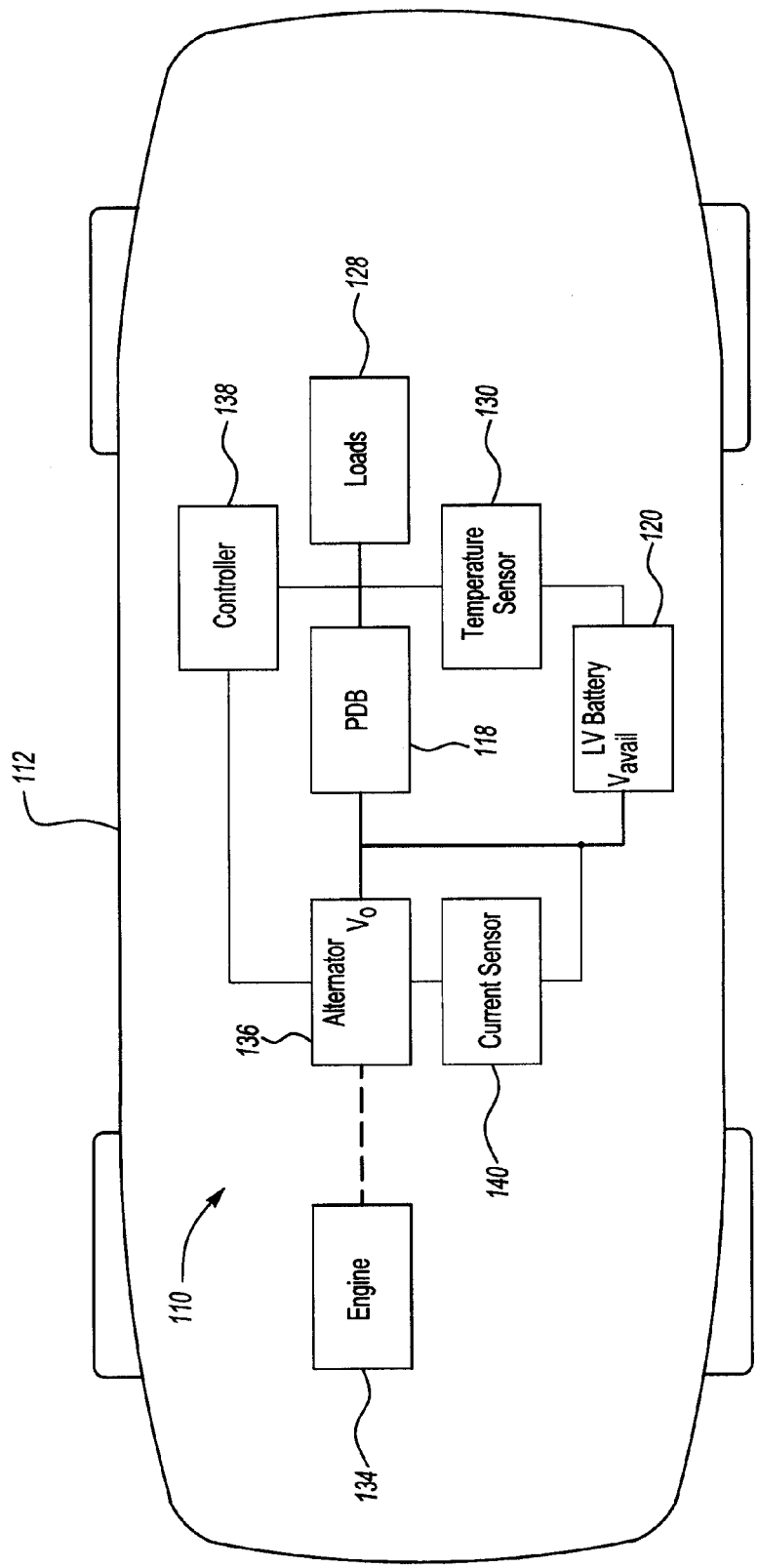
FIG. 2 is a schematic diagram of another example automotive power system.

FIG. 2 is a schematic diagram of power system 110 for vehicle 112. Elements differing by factors of 100 have similar, although not necessarily identical, descriptions. Engine 134 provides mechanical power to alternator 136. Alternator 136 converts this mechanical power to electrical power. As a result, alternator 136 outputs a voltage, e.g., $V_o$.

Power distribution box 118 distributes the current required, e.g., I, to support loads 128. This current may vary over time as occupants of vehicle 112 may selectively operate loads 128. Power distribution box 118 pulls the required current, e.g., I, from alternator 136.

In the embodiment of FIG. 2, an electrical cable, having a resistance $R_{cable}$, electrically connects alternator 136 with low voltage battery 120. As such, as current, e.g., $I_o$, travels along this cable, the voltage drops due to losses, e.g., $I_o \times R_{cable}$. The resulting voltage at low voltage battery 120, e.g., $V_{avail}$, is the voltage available, for example, to charge low voltage battery 120.

Controller 138, e.g., microprocessor, reads the temperature from temperature sensor 130, e.g., $T_{batt}$, and communicates it, e.g., responds to requests for information, to alternator 136. Alternator 136 reads the current, e.g., $I_o$, from current sensor 140, e.g., hall sensor, shunt, etc. As discussed below, alternator 136 sets $V_o$ based on $T_{batt}$ and $I_o$.

Figure 3:
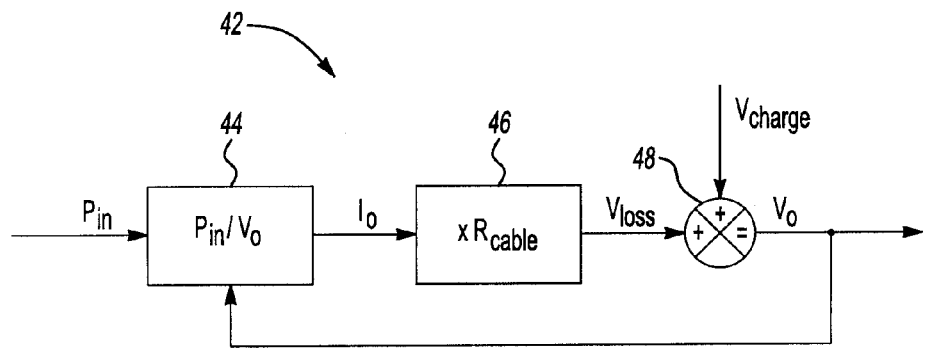
FIG. 3 is a schematic diagram of example control logic for an automotive power system.

FIG. 3 is a schematic diagram of control logic 42. At control block 44, power in, $P_{in}$, e.g., power from high voltage battery 14 (FIG. 1), is divided by $V_o$ yielding $I_o$. At control block 46, $I_o$ is multiplied by $R_{cable}$ yielding $V_{loss}$. At 48, $V_{loss}$ is summed with $V_{charge}$ yielding $V_o$. In the embodiment of FIG. 3, control logic 42 is implemented by DC/DC power converter 16 (FIG. 1). In alternative embodiments, control logic 42 may be implemented by one or more controllers collectively configured to execute the strategies discussed herein. Some or all of these controllers, for example, may be integrated with other components, e.g., DC/DC power converter 16.

Figure 4:
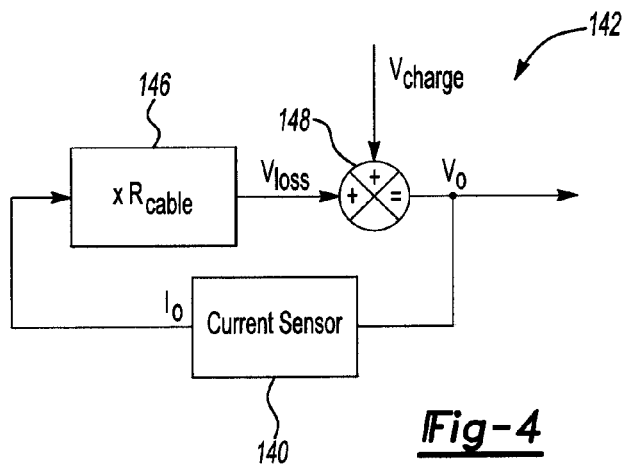
FIG. 4 is a schematic diagram of another example control logic for an automotive power system.

FIG. 4 is a schematic diagram of control logic 142. At control block 146, $I_o$ is multiplied by $R_{cable}$ yielding $V_{loss}$. At 148, $V_{loss}$ is summed with $V_{charge}$ yielding $V_o$. In the embodiment of FIG. 4, control logic 142 of FIG. 4 is implemented by alternator 136 (FIG. 2). In alternative embodiments, control logic 142 may be implemented by one or more controllers collectively configured to execute the strategies discussed herein. Some or all of these controllers, for example, may be integrated with other components, e.g., alternator 136, controller 138, etc.

Figure 5:
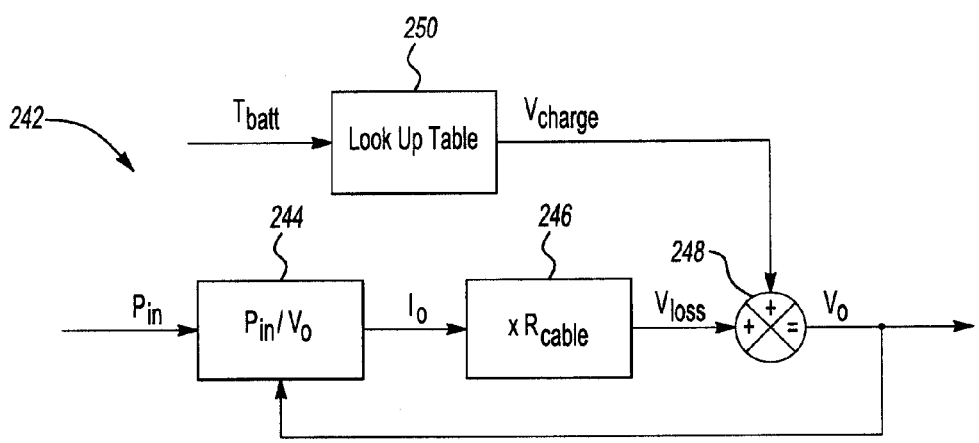
FIG. 5 is a schematic diagram of yet another example control logic for an automotive power system.

FIG. 5 is a schematic diagram of control logic 242. At control block 244, power in, $P_{in}$, is divided by $V_o$ yielding $I_o$. At control block 246, $I_o$ is multiplied by $R_{cable}$ yielding $V_{loss}$. At control block 250, a look up table is inspected to determine $V_{charge}$ based on $T_{batt}$. At 248, $V_{loss}$ is summed with $V_{charge}$ yielding $V_o$. As discussed above, control logic 242 may be implemented by one or more controllers collectively configured to execute the strategies discussed herein. For example, control block 250 may be implemented by powertrain control module 32 (FIG. 1), DC/DC power converter 16 (FIG. 1), or controller 138 (FIG. 2).

Figure 6:
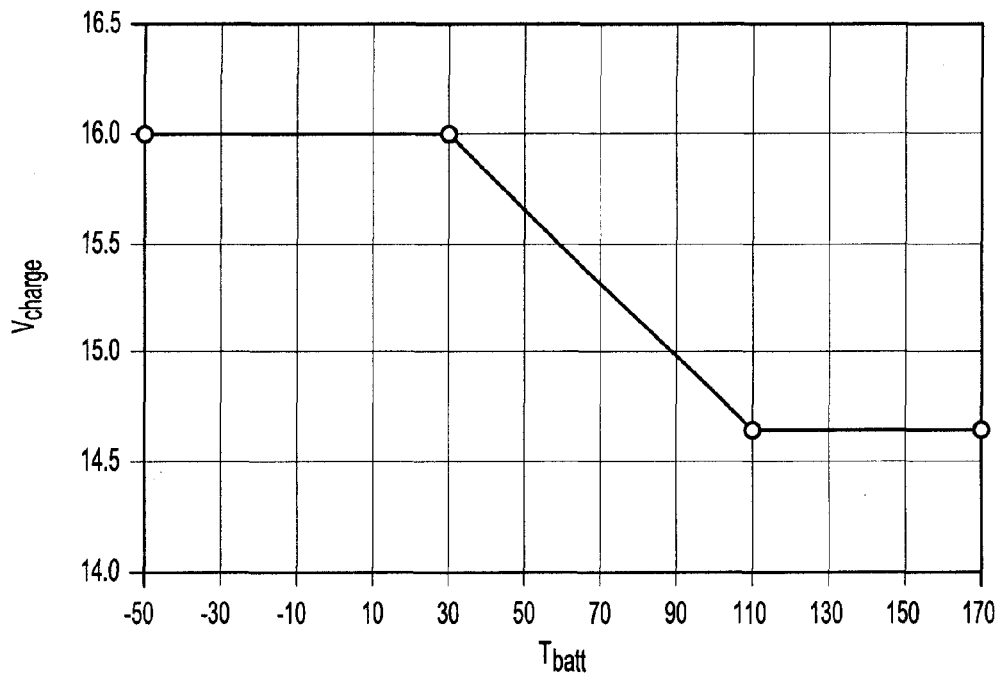
FIG. 6 is an example graphical representation of charge voltage versus battery temperature.

FIG. 6 is an example graphical representation of charge voltage versus battery temperature. For lower battery temperatures, e.g., temperatures below 30 degrees F., a higher charge voltage, e.g., 16 volts, may be used to charge low voltage battery 20 (FIG. 1). As battery temperatures increase, however, a lower charge voltage may be used, e.g., 15.5 volts, etc. Charge voltages that are too high or too low, for a given battery temperature, may adversely affect battery performance and life. The graphical representation of FIG. 6 may be implemented, for example, as the look up table in control block 250 (FIG. 5).

Figure 7:
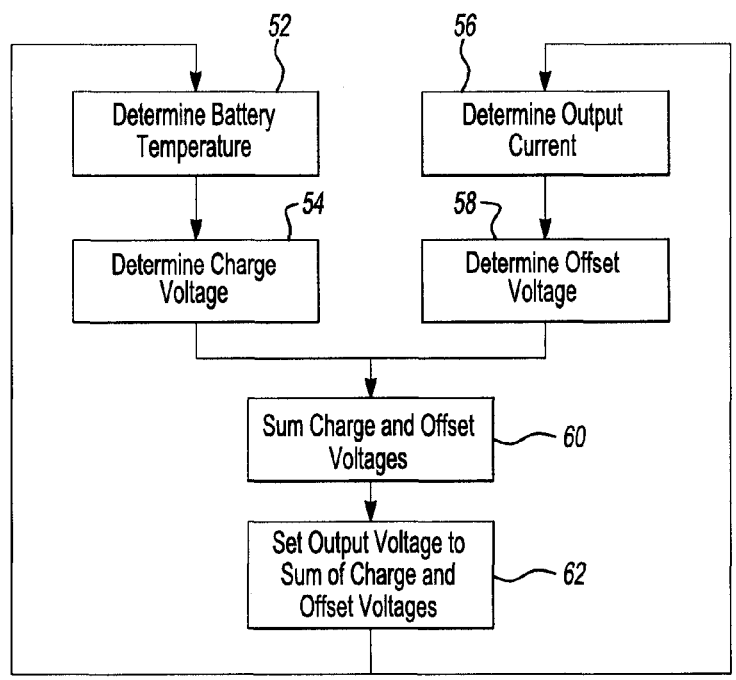
FIG. 7 is a flow chart of a control strategy for setting an output voltage of a power source.

FIG. 7 is a flow chart of a control strategy for setting an output voltage of a power source. At 52, a battery temperature is determined. At 54, a charge voltage is determined. At 56, an output current is determined. At 58, an offset voltage is determined. At 60, the charge and offset voltages are summed. At 62, the output voltage is set equal to the sum of the charge and offset voltages.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A power system for an automotive vehicle comprising:
   a power source configured to present a voltage and provide a current based on the presented voltage;
   a power storage unit configured to receive at least a portion of the provided current;
   an electrical load having a variable demand for current and configured to receive at least a portion of the provided current; and
   a control system configured to cause the presented voltage to vary according to a temperature associated with the power storage unit and a value of the provided current.

2. The system of claim 1 further comprising a temperature sensor for sensing the temperature associated with the power storage unit.

3. The system of claim 1 further comprising a sensor for sensing a parameter indicative of the provided current.

4. The system of claim 1 wherein the power storage unit comprises a battery.

5. The system of claim 1 wherein the power source comprises a power converter.

6. The system of claim 5 wherein the power converter comprises a direct current to direct current power converter.

7. The system of claim 1 wherein the power source comprises an alternator.

8. The system of claim 1 wherein the electrical load comprises at least one of a climate control system, a lighting system, and an audio system.

9. The system of claim 1 wherein the control system comprises at least one control module.

10. The system of claim 9 wherein the at least one control module comprises a powertrain control module.

11. The system of claim 10 wherein the at least one control module is integrated with the power source.

12. A power system for an alternatively powered vehicle comprising:
    a power converter having an output voltage and configured to provide current based on the output voltage;
    a battery configured to receive at least a portion of the provided current; and
    one or more controllers configured to cause the output voltage to vary according to a temperature associated with the battery and a value of the provided current.

13. The system of claim 12 further comprising a temperature sensor for sensing the temperature associated with the battery.

14. The system of claim 12 further comprising a sensor for sensing a parameter indicative of the provided current.

15. The system of claim 12 wherein the electrical load comprises at least one of a climate control system, a lighting system, and an audio system.

16. The system of claim 12 wherein the at least one of the one or more controllers is integrated with the power converter.

17. A method for setting an output voltage of a power source for an automotive vehicle wherein the power source is configured to provide a current based on the output voltage and wherein the automotive vehicle includes a power storage unit configured to receive at least a portion of the current, the method comprising:
    determining a desired charge voltage for the power storage unit;
    determining an offset voltage based on the current; and
    causing the output voltage of the power source to vary according to the desired charge and offset voltages.

18. The method of claim 17 wherein the desired charge voltage for the power storage unit is determined based on a temperature associated with the power storage unit.

19. The method of claim 18 further comprising sensing the temperature associated with the power storage unit.

20. The method of claim 17 further comprising sensing a parameter indicative of the current.

* * * * *